Oct. 19, 1965 W. A. GEYGER 3,213,203

DOUBLE INTEGRATOR MAGNETIC AMPLIFIER OUTPUT CIRCUIT

Filed Nov. 9, 1960

INVENTOR.
WILLIAM A. GEYGER

BY W. O. Quesenberry
O. E. Hodges
ATTYS.

United States Patent Office 3,213,203
Patented Oct. 19, 1965

3,213,203

DOUBLE INTEGRATOR MAGNETIC AMPLIFIER OUTPUT CIRCUIT

William A. Geyger, Takoma Park, Md., assignor to the United States of America as represented by the Secretary of the Navy Filed Nov. 9, 1960, Ser. No. 68,317
4 Claims. (Cl. 179—100.2)
(Granted under Title 35, U.S. Code (1952), sec. 266)

Figure 1:
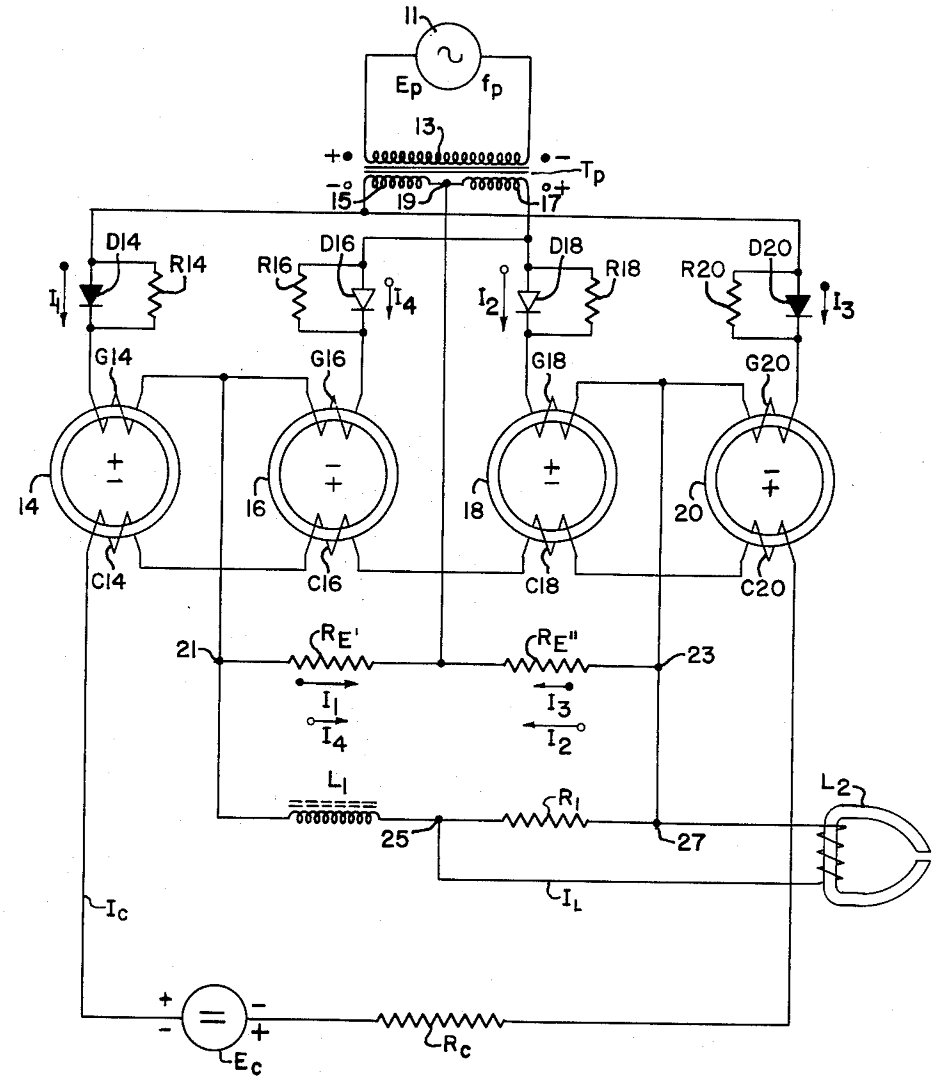

The invention described herein may be manufactured and used by or for the Government of the United States of America for governmental purposes without the payment of any royalties thereon or therefor.

This invention relates to a magnetic amplifier with integrating means in the A.C. output circuit and more particularly to a magnetic amplifier having an integrating circuit adapted to produce a sinusoidal output voltage.

The present invention solves the problem of producing a sinusoidal output voltage of a push-pull type magnetic amplifier in such a way that the current flowing through the load is within zero to ±1 to 2% linear to the input current of the amplifier. This is accomplished in accordance with the present invention by applying two properly rated integrating circuits to the output of a push-pull magnetic amplifier. The combination of a push-pull magnetic amplifier circuit with a symmetrical output waveform and the integrating circuits make the sinusoidal output current with the required linearity possible.

An object of this invention is to provide a magnetic amplifier circuit with an integrating circuit to produce a nearly pure sinusoidal output voltage.

Another object of this invention is to provide a magnetic amplifier circuit capable of producing a phase reversible A.C. output voltage.

Another object of this invention is to provide a double integrating circuit for the output of a magnetic amplifier to provide a sinusoidal output waveform.

A further object is to provide a sinusoidal output current flowing through the excitation winding of a tape recorder head.

A still further object of this invention is to provide a magnetic amplifier circuit for producing a sinusoidal current which is linear within ±1 to 2% of the polarity reversible input current.

Figure 2:
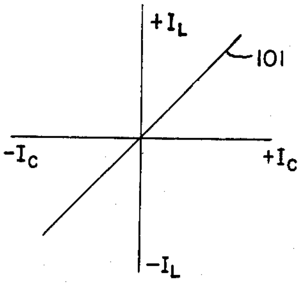

Other objects and many of the attendant advantages of this invention will be readily appreciated as the same becomes better understood by reference to the following detailed description when considered in connection with the accompanying drawing in which like reference numerals designate like parts throughout the figures thereof and wherein:

FIG. 1 illustrates an exemplary embodiment of the magnetic amplifier double integrator circuit of this invention; and FIG. 2 of the drawing is a graph illustrating the linear relationship between $I_L$ and $I_c$.

Referring now to FIG. 1 of the drawing, an A.C. voltage source 11 having a voltage $E_p$ and a frequency $f_p$ feeds primary winding 13 of transformer $T_p$. Saturable reactor cores 14, 16, 18 and 20 have gate windings G14, G16, G18 and G20 respectively wound thereon and control windings C14, C16, C18 and C20 respectively wound thereon. Gate windings G14, G16, G18 and G20 are connected to the center-tapped secondary winding of transformer $T_p$ through diodes D14, D16, D18 and D20 respectively. Diodes D14, D16, D18 and D20 are provided with shunt resistors R14, R16, R18 and R20 respectively to bring the quiescent currents to the desired value, preferably half of the maximum load current values.

Mixing resistors $R_{E'}$ and $R_{E''}$ connect to the gate circuits of the magnetic amplifier and to the center tap of the secondary winding of transformer $T_p$. A polarity reversible D.C. control voltage source $E_c$ and resistor $R_c$ are connected serially to control windings C14, C16, C18 and C20. Two integrating circuits are connected to the mixing resistors $R_{E'}$, $R_{E''}$ of the magnetic amplifier. The first integrating circuit comprises linear powder core inductor $L_1$ and resistor $R_1$ which are serially connected to output through terminals 21 and 23 of the magnetic amplifier. The second integrating circuit comprises inductive load $L_2$, for example, a tape recorder head, which is connected across resistor $R_1$ at terminals 25 and 27.

For the operation of the circuitry of this invention the symbol used such as black dots, white dots, arrows of varying lengths, plus minus (±) and minus plus (∓) of the saturable reactors, black diodes and white diodes, reference is made to U.S. Patents No. 2,700,130 to W. A. Geyger. The (±) and the (∓) symbols of the saturable reactors indicate the relationship of the sense of the gate or load windings and the control windings. Black dots and black diodes are used to denote positive half cycles of supply voltage $E_p$. White dots and white diodes are used to indicate negative half cycles of supply voltage $E_p$. Arrows attached to black or white dots indicate the magnitude of current flow for the particular half-cycle denoted by the color of dot attached to the arrow.

In operation, an alternating voltage source having a voltage $E_p$ and a frequency $f_p$ is fed to the primary winding of transformer $T_p$ and energy is supplied to the load or gate windings of the saturable reactors through the center tapped secondary winding of the transformer. During positive half cycles (black dots, black diodes) current $I_1$ will flow from one terminal of secondary winding 15 through diode D14 through gate winding G14 and through resistor $R_{E'}$ and to the center tap 19. At the same time, current $I_3$ will flow from one end of secondary winding 15 through diode D20, through gate winding G20 through resistor $R_{E''}$ and to the center tap 19. The resultant current flow in the output circuit for the positive half cycle of supply voltage $E_p$ is $I_1—I_3$. During the negative half-cycle of supply voltage $E_p$, current $I_4$ will flow from one terminal of secondary winding 17 through diode D16 through gate winding G16 and through resistor $R_{E'}$ and to the center tap 19 of transformer $T_p$. At the same time, current $I_2$ will flow from one end of secondary winding 17 through diode D18, gate winding G18, through resistor $R_{E''}$ and to center tap 19. The resultant current flow for the negative half cycle of supply voltage $E_p$ is $I_2—I_4$.

The output of the magnetic amplifier has a highly distorted A.C. waveform. After integration by the first integrating circuit comprising inductor $L_1$ and resistor $R_1$ and the second integration circuit comprising inductor $L_2$, the output voltage is a virtually undistorted sine wave having a frequency $f_p$, the same as that of source $E_p$. By varying the control voltage $E_c$ and hence the control current $I_c$, the amplitude of the output voltage across $L_2$ is also varied. The relationship between $I_c$ and $I_L$ is linear within ±1 to 2% in accordance with results of experimental investigations. Line 101 of FIG. 2 illustrates the relationship between $I_L$ and $I_c$.

In an exemplary embodiment of this invention a frequency $f_p$ of 400 cycles may be used. Inductor $L_1$ may be a molybdenum permalloy powder core having an inductance value of 1.5 henrys and a resistance value of 100 ohms. Resistance $R_1$ may have a value of 1,500 ohms. Inductor $L_2$ may be a tape recorder head having an inductance value of 0.5 henry and a resistance value of 100 ohms. The control current $I_c$ may vary between zero and ±1 milliampere. Control voltage $E_c$ may be a D.C. voltage or a slowly varying A.C. voltage. If an A.C. control voltage is used the frequency should not be greater than from 1/5 to 1/10 of the supply voltage frequency $f_p$.

Obviously many modifications and variations of the present invention are possible in the light of the above teachings. It is therefore understood that within the scope of the appended claims, the invention may be practiced otherwise than as specifically described.

What is claimed as new and desired to be secured by Letters Patent of the United States is:

1. Apparatus for producing a sinusoidal alternating current comprising a magnetic amplifier, said magnetic amplifier having two saturable reactor systems operating in push pull and including a common load circuit and a common control circuit, a polarity reversible control voltage source connected to said control circuit, said load circuit having an A.C. output voltage, a first integrating circuit comprising a linear inductor having a winding thereon, a resistor, means serially connecting the winding of said linear inductor and said resistor across the load circuit of said magnetic amplifier, a second integrating circuit comprising an inductive load having a winding thereon, the winding of said inductive load being connected across said resistor whereby the output voltage of said magnetic amplifier is integrated twice to produce said sinusoidal alternating current in said inductive load.

2. A double integrating circuit comprising a magnetic amplifier having a load circuit and a control circuit, an A.C. voltage source connected to said load circuit whereby said magnetic amplifier is energized, a polarity reversible control voltage source connected to said control circuit whereby the output from the load circuit of said magnetic amplifier may be controlled, a first integrating means connected to said load circuit comprising serially connected inductor means and resistor means, a second integrating circuit comprising an iron core inductor connected across said resistor means whereby a sinusoidal output voltage is produced which is linearly proportional to the amplitude of said control voltage.

3. Magnetic amplifier apparatus for producing a sinusoidal alternating current output linearly proportional to a control current, comprising first, second, third and fourth saturable reactors, a load circuit, a control circuit, said load circuit including a winding on each of said cores, said control circuit including a winding on each of said cores, a load circuit output resistance means, an A.C. voltage source, means connecting said source to said load circuit whereby an output voltage may be produced across said output resistance means, an integrating circuit comprising a first integrating means connected across said output resistance means, a second integrating means including a tape recorder head connected across a portion of said first integrating means whereby a sinusoidal voltage is produced in said tape recorder head, a polarity reversible voltage connected to said control circuit whereby the magnitude of said sinusoidal voltage may be controlled.

4. A magnetic modulator having a sinusoidal output voltage comprising saturable reactor means including a control circuit and a load circuit, an A.C. voltage source connected to said load circuit whereby said modulator may be energized, said load circuit including a load impedance means, an ultra low frequency signal source, means connecting said signal source to said control circuit, first integrating means connected across said load impedance means, said first integrating means consisting of an inductor and a resistor serially connected, second integrating means connected across said resistor, said second integrating means including a magnetic tape recording head.

References Cited by the Examiner

UNITED STATES PATENTS

| | | | |
|---|---|---|---|
| 2,573,818 | 11/51 | Votruba | 330—8 |
| 2,777,946 | 1/57 | Owen et al. | 328—127 |

IRVING L. SRAGOW, *Primary Examiner.*

STEPHEN W. CAPELLI, *Examiner.*